(12) United States Patent
Blake

(10) Patent No.: US 6,768,057 B2
(45) Date of Patent: Jul. 27, 2004

(54) CONNECTOR FOR FLEXIBLE ELECTRICAL CONDUIT

(75) Inventor: Geoffrey Blake, Sharon, MA (US)

(73) Assignee: IBC Corporation, South Easton, MA (US)

( * ) Notice: Subject to any disclaimer, the term of this patent is extended or adjusted under 35 U.S.C. 154(b) by 462 days.

(21) Appl. No.: 09/804,159

(22) Filed: Mar. 12, 2001

(65) Prior Publication Data

US 2002/0125033 A1 Sep. 12, 2002

(51) Int. Cl.⁷ .................................................. H02G 3/18
(52) U.S. Cl. ........................ 174/65 R; 174/48; 174/135; 248/56; 220/3.3
(58) Field of Search ............................ 174/48, 50, 135, 174/72 A, 74 A, 68.1, 68.3, 65 R, 65 G, 153 G, 152 G, 151; 248/56; 16/2.1, 2.2; 220/3.3, 3.5; 385/134, 135; 439/548, 544, 567; 52/220.1, 220.2, 220.3, 220.7

(56) References Cited

U.S. PATENT DOCUMENTS

| | | | | |
|---|---|---|---|---|
| 2,967,722 A | * | 1/1961 | Lifka | 285/424 |
| 3,809,798 A | * | 5/1974 | Simon | 174/59 |
| 4,012,578 A | | 3/1977 | Moran et al. | 174/51 |
| 4,021,604 A | | 5/1977 | Dole et al. | 174/51 |
| 4,366,344 A | | 12/1982 | Sheenhan | 174/65 |
| 4,619,332 A | | 10/1986 | Sheenhan | 174/65 |
| 4,880,387 A | | 11/1989 | Stikeleather et al. | 439/98 |
| 4,990,721 A | | 2/1991 | Sheenhan | 174/65 |
| 5,160,811 A | * | 11/1992 | Ritzmann | 174/68.3 |
| 5,283,393 A | * | 2/1994 | Guginsky | 174/68.1 |
| 5,563,378 A | | 10/1996 | Uchida et al. | 174/135 |
| 5,693,908 A | * | 12/1997 | Amberger | 174/48 |
| 6,013,875 A | * | 1/2000 | Fridenberg et al. | 174/68.3 |
| 6,034,326 A | | 3/2000 | Jorgensen | 174/65 |
| 6,069,317 A | * | 5/2000 | Wagganer | 174/65 R |
| 6,300,569 B1 | * | 10/2001 | Mullen, Jr. | 174/65 R |
| 6,380,483 B1 | * | 4/2002 | Blake | 174/65 R |
| 6,580,029 B1 | * | 6/2003 | Bing | 174/48 |
| 6,593,531 B2 | * | 7/2003 | Hulsmann et al. | 174/66 |

\* cited by examiner

Primary Examiner—Dean Reichard
Assistant Examiner—Angel R. Estrada
(74) Attorney, Agent, or Firm—Grossman, Tucker, Perreault & Pfleger, PLLC

(57) ABSTRACT

A right angle connector for connecting conduit to a junction box having an opening therein. The connector includes a base and a cap. The base may include a tab for establishing a snap fit connection with the cap. According to another aspect of the invention, the base may include a plurality of spring members for resiliently retaining the conduit at approximately a right angle to the opening in the junction box. According to another aspect of the invention, the base may include a plurality of resiliently deformable elements configured to establish a snap fit connection with the opening in the junction box. The deformable elements may extend from an annular bottom portion of the base defining an opening through which wires in the conduit may pass to enter the junction box.

24 Claims, 4 Drawing Sheets

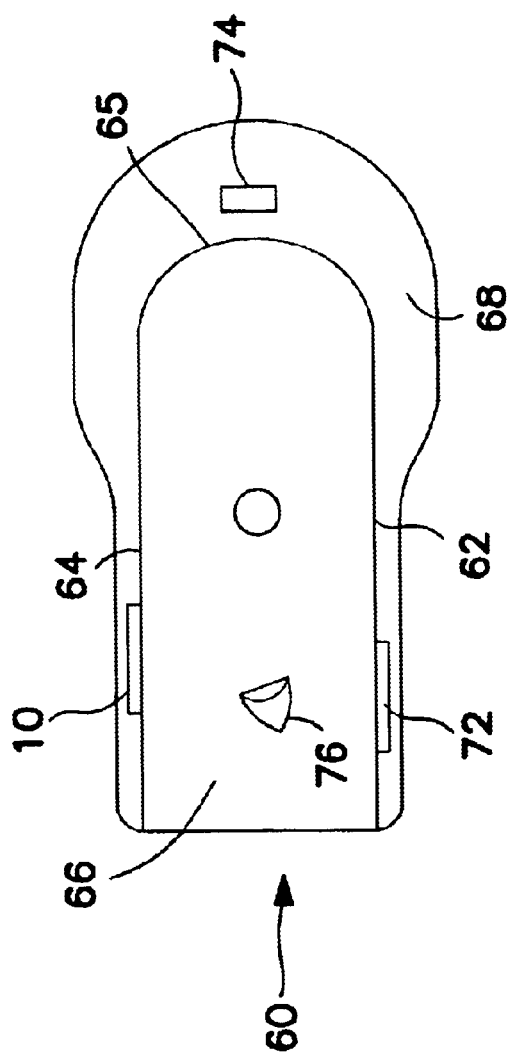
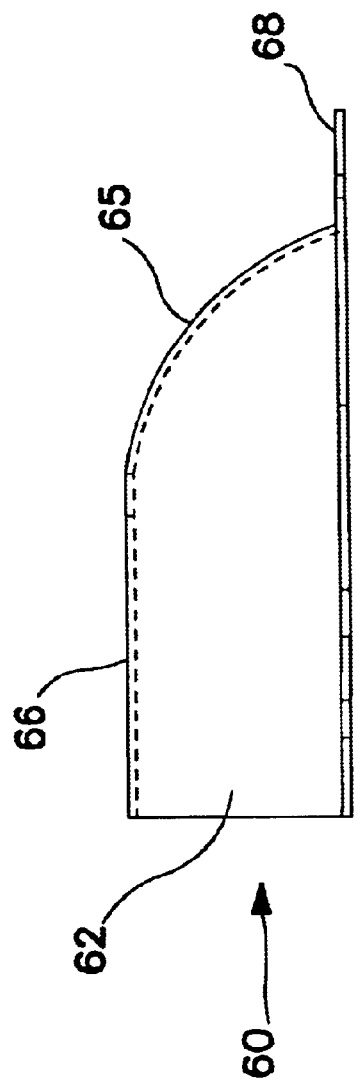

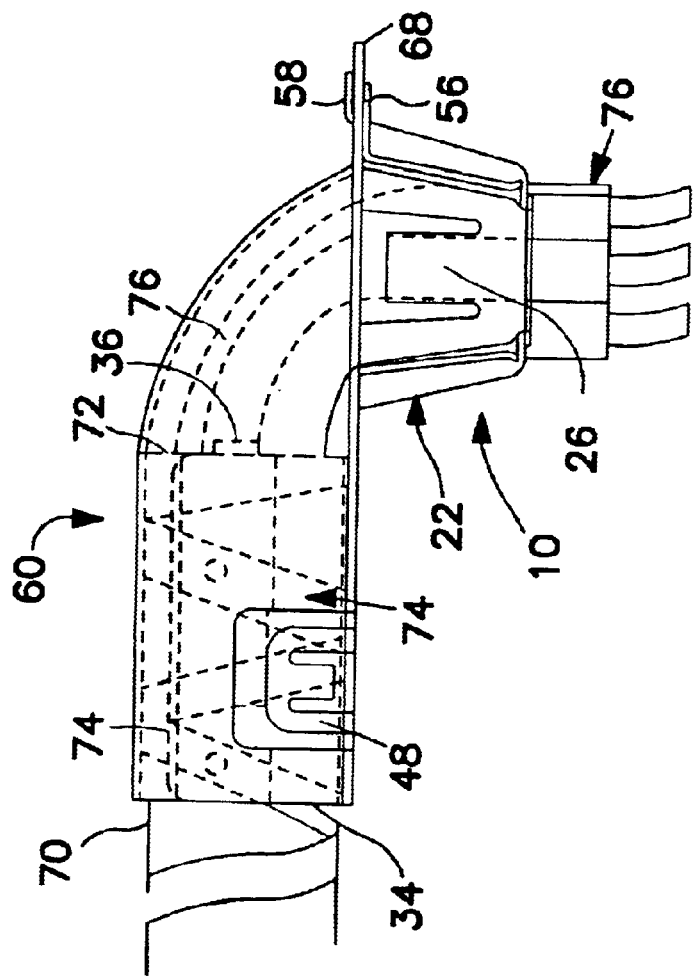
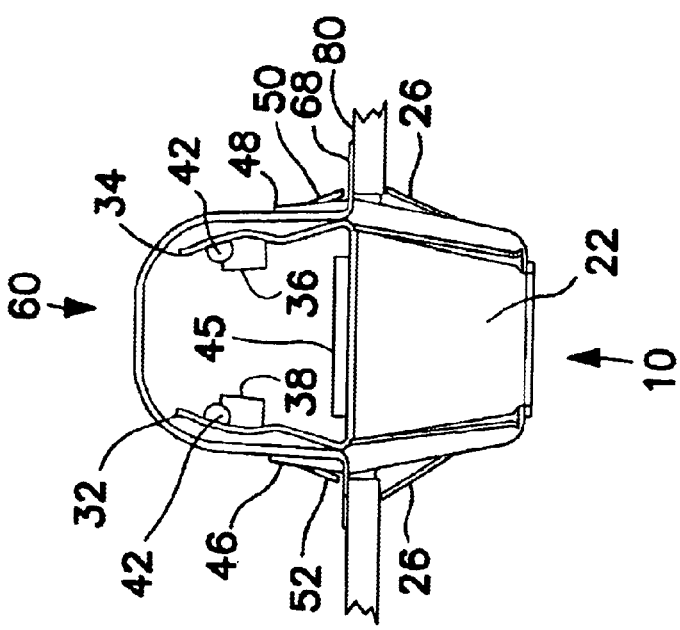

US 6,768,057 B2

CONNECTOR FOR FLEXIBLE ELECTRICAL CONDUIT

FIELD OF THE INVENTION

The present invention relates to connectors for securing helically grooved flexible electrical conduit to housings, such as junction boxes, fixtures, and the like.

BACKGROUND OF THE INVENTION

Flexible electrical conduit is frequently used in residential and commercial wiring in order to satisfy building codes, and because of the versatility imparted by the flexible nature of the conduit. All of the wiring typically originates at a central fuse box, or junction box, and may terminate at, or pass through, a variety of fixtures or other various housings requiring electrical connections. In order to prevent the wire from being pulled free at any of these locations, the electrical conduit may be secured to the junction box and any fixture along the way.

Conventionally, when it is desired to approach a junction box along its side, i.e., with the axis of the flexible conduit perpendicular to the axis of a knockout hole through which the wiring in the conduit must pass, a right angle die cast connector is employed. Right angle die cast connectors typically include several parts, e.g., a body, a locking nut, a cap, and screws. The body is inserted into the knockout hole and secured therein using the locking nut. The flexible conduit is then laid in the open body and the cap is attached using the screws, thereby clamping the conduit between the body and the cap.

This style of connector requires time and patience to install. As junction boxes are often located in areas to which access is limited, a great deal of dexterity is required to simultaneously hold the conduit in place, apply the cap, and hold the cap in place while the screws are threaded through often mis-aligned holes in the cap and the body. The difficulty of installation makes such die cast connectors undesirable. In addition, the multiple parts of these connectors require undesirable manufacturing cost and complexity.

Accordingly, there is a need in the art for a right angle connector that may be quickly and easily installed. There is a further need in the art for a right angle connector that may be efficiently and cost-effectively manufactured.

SUMMARY OF THE INVENTION

In one embodiment, a connector for connecting conduit to a junction box having an opening therein consistent with the invention may include: a base for receiving the conduit at approximately a right angle to the opening, and a cap configured to cover at least a portion of the base with a portion of the conduit disposed between the cap and the base. The base may include at least one cap retainer tab extending therefrom. The cap may include a slot configured to receive the retainer tab to establish a snap-fit connection between the base and the cap.

According to another aspect of the invention, the base may include a plurality of spring members for resiliently retaining the conduit at approximately a right angle to the opening in the junction box. According to another aspect of the invention, the base may include a plurality of resiliently deformable elements configured to establish a snap fit connection with the opening in the junction box. The deformable elements may extend from an annular bottom portion defining an opening through which wires in the conduit may pass to enter the junction box.

BRIEF DESCRIPTION OF THE DRAWING

For a better understanding of the present invention, together with other objects, features and advantages, reference should be made to the following detailed description which should be read in conjunction with the following figures wherein like numerals represent like parts:

FIG. 4 is a plan view of an exemplary cap of a connector consistent with the present invention;

FIG. 5 is a side elevation of an exemplary cap of a connector consistent with the present invention;

FIG. 6 is an end view of an exemplary connector consistent with the present invention; and FIG. 7 is a side elevation of an exemplary connector consistent with the present invention.

DETAILED DESCRIPTION

With reference now to FIGS. 1–7, an exemplary connector consistent with the present invention includes a base, generally indicated at 10, and a cap, generally indicated at 60. The base 10 may include a truncated conical portion for securing the connector within the knockout hole of a junction box. The cap 60 is oriented at approximately a right angle to the central axis of the conical portion. The base and cap may each be formed as a single piece and constructed from a resiliently deformable material, e.g. sheet metal. Furthermore, that base material may be electrically conductive.

Figure 2:
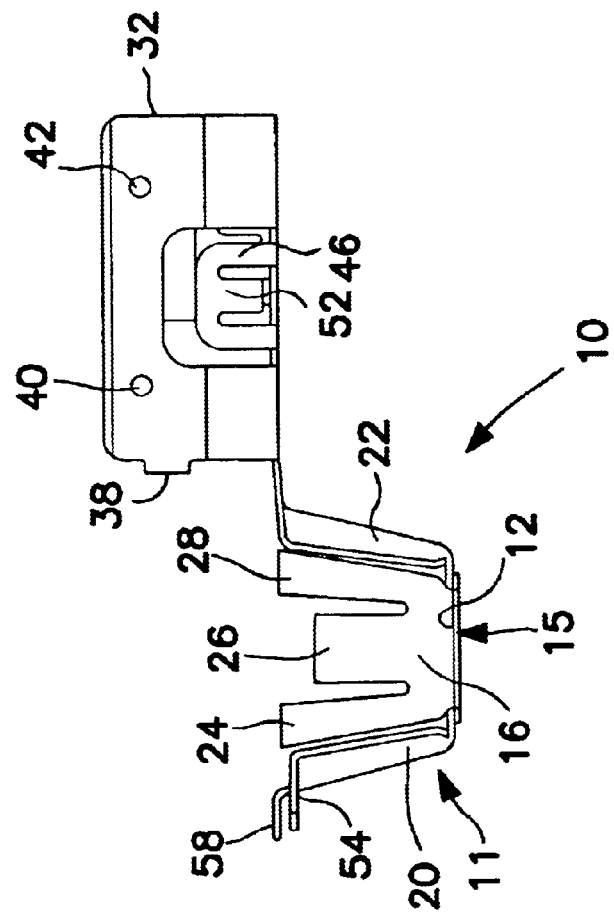
FIG. 2 is a side elevation of an exemplary base of a connector consistent with the present invention.
Figure 1:
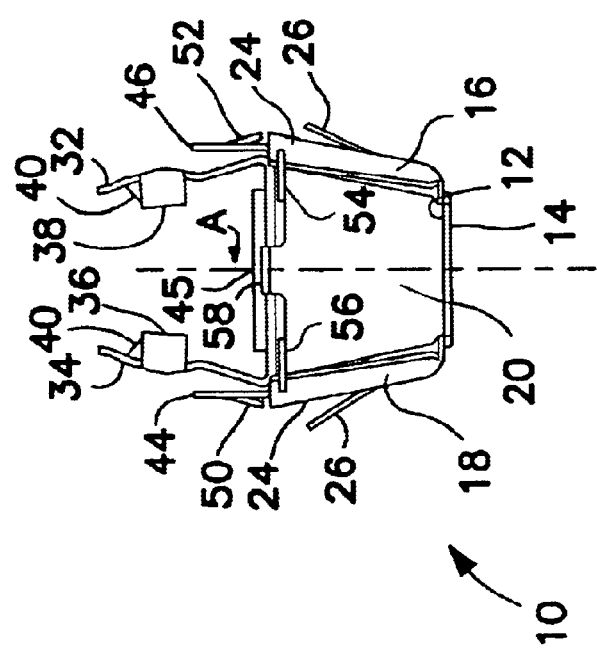
FIG. 1 is an end view of an exemplary base of a connector consistent with the present invention.
Figure 3:
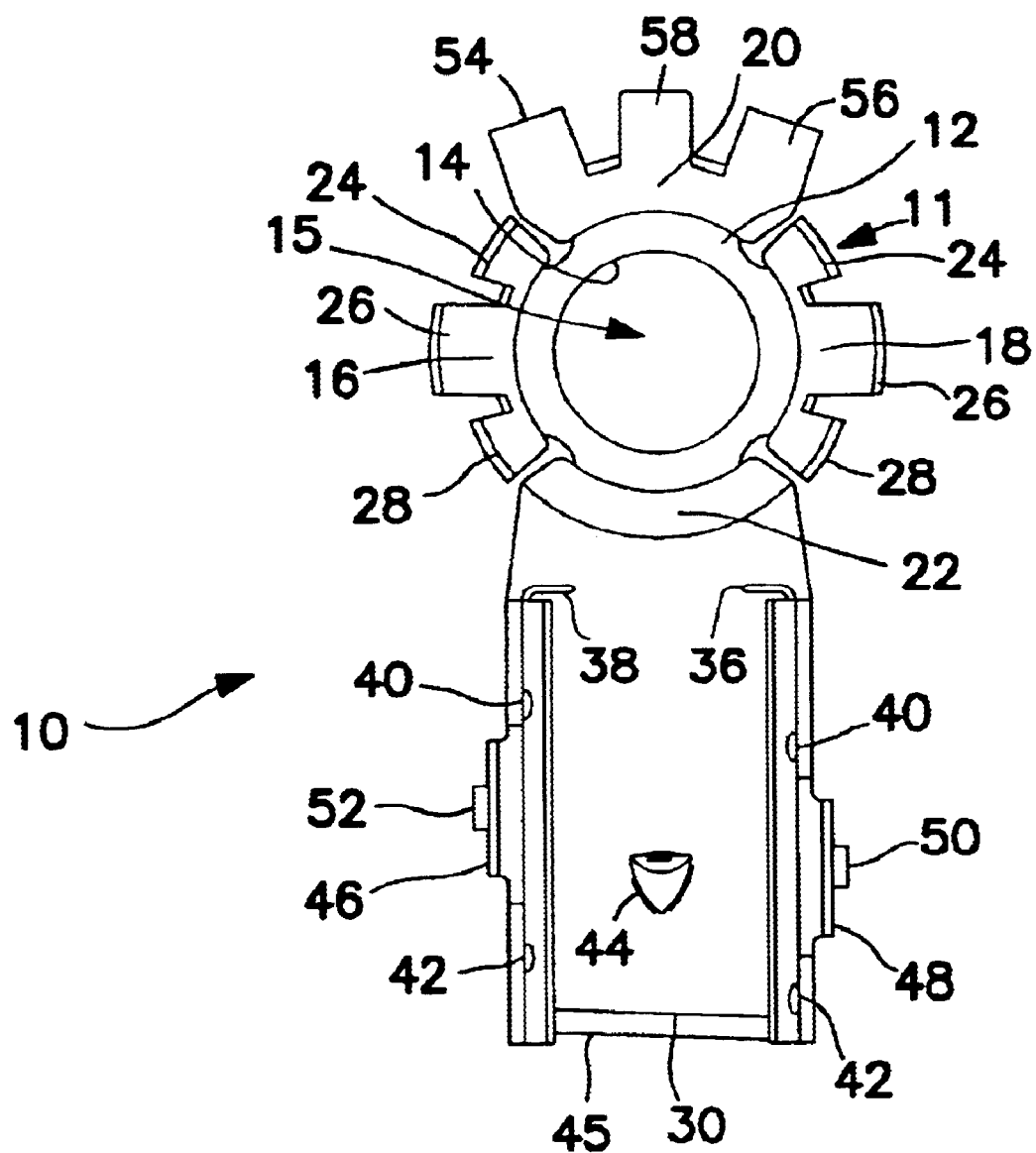
FIG. 3 is a plan view of an exemplary base of a connector consistent with the present invention.

As illustrated in FIGS. 1 through 3, the truncated conical portion 11 of base 10 comprises an annular bottom portion 12 from which the conical portion extends. The conical portion of the connector preferably comprises a plurality of substantially independently flexible segments 16, 18, 20, 22, thus allowing a high degree of resilient deformation. In the illustrated exemplary embodiment the side segments 16 and 18 further comprise three fingers 24, 26, and 28, wherein the retainer finger 26 is flared outward at a greater angle than the adjacent fingers 24 and 28. The retainer finger 26 may be shorter than the adjacent fingers 24 and 28.

In the illustrated exemplary embodiment, the conical portion 11 additionally comprises a rearward segment 22. At the upper circumference of the conical portion, the rearward segment 22 comprises a generally planar member 30 extending therefrom. Planar member 30 may be oriented approximately perpendicular to the axis A of the conical portion of the connector.

The opposed sides of planar member 30 are configured to form generally upstanding side-clips 32 and 34. The side-clips 32 and 34 may assume a generally inwardly canted orientation, and may be somewhat arcuate to better conform to the tubular form of a flexible conduit. Extending from the inward and forward edge of each side-clip 32 and 34 are stop tabs 36 and 38. The stop tabs 36 and 38 are oriented generally orthogonal to the side-clips 32 and 34.

The side-clips 32 and 34, as well as planar member 30, comprise a plurality of features for resisting pull-out of the conduit, and maintaining reliable electrical contact with the conduit. Each side-clip 32 and 34 may include two inwardly projecting features 40 and 42. Inwardly projecting features 40 and 42 are spaced apart by a predetermined distance such that they will extend into the helical groove of a flexible conduit on each side thereof. Similarly, the planar member 30 may include a forwardly directed barb 44 and a transverse tab 45 configured to extend into the helical groove at the bottom of the flexible conduit.

The planar member 30 of the base 10 further comprises cap retainers 46, 48 for securing the cap 60 to the base 10. The cap retainers 46 and 48 may be employed as generally vertical, up-standing tabs having downwardly opening barbs 50 and 52, best seen in FIG. 1. The cap retainers enable a snap-fit of the cap to the base.

The conical portion of base 10 also comprises a forward conical segment 20 extending from annular bottom portion 12. In the illustrated embodiment, the upper edge of forward segment 20 contains a flange feature that is generally perpendicular to the axis A of the conical portion. The flange feature comprises two flange tabs 54 and 56 and a cap retaining flange 58. The two flange tabs 54 and 56 may be generally coplanar with the planar member 30 extending from the rear conical segment 22. The cap retaining flange 58, however, is displaced vertically upwards to accommodate the thickness of cap 60, as best seen from FIG. 2.

Turning now to FIGS. 4 and 5, the cap 60 includes a generally rectangular shell having opposed upright sidewalls 62 and 64 and top portion 66. As shown in FIG. 5, the front 65 of cap 60 may be a downwardly arcuate extension of top portion 66. Also, the transition between side walls 62 and 64 and the top portion 66 may be relieved to provide rounded corners.

The bottom of cap 60 comprises a perimeter flange 68. The flange 68 includes slots 70 and 72 adjacent sidewalls 62 and 64. Slots 70 and 72 are configured in size and position to receive cap retainers 46 and 48 of base 10. Further, the front of the flange 68 includes a slot 74 configured in size and location to receive the cap retaining flange 58 of base 10.

Securement of the flexible conduit to the connector may be enhanced by providing a barb 76 in top portion 66 of cap 60. The barb 76 comprises a forward facing protuberance into the cap 60 from the top 66, and extends into the helical groove in the top of the conduit.

An assembled exemplary connector consistent with the present invention is illustrated in FIGS. 6 and 7. FIG. 6 shows the connector secured within a knockout hole of junction box 80, which is shown in partial sectional view. FIG. 7 shows flexible conduit 70 installed in a connector consistent with the invention. As shown, cap 60 fits over and covers side-clips 32 and 34, as well as covering the conical portion of base 10. Cap 60 is secured to base 10 by barbs 50 and 52 of cap retainers 46 and 48 passing through slots 70 and 72 in flange 68. Additionally, cap 60 is secured to base 10 at the front by cap retaining flange 58 of base 10 received through slot 74 in flange 68 of cap 60.

To install conduit 70 using a connector consistent with the present invention, the flexible conduit 70 is pressed downward between the side-clips 32 and 34 of base 10 such that the end 72 of the conduit abuts stop tabs 36 and 38 and the projecting features 40, 42, barb 44, and transverse tab 45 extend into the helical groove 74 in the conduit. The side clips 32 and 34 employed in this manner securely retain the conduit to the base 10 therein leaving fewer separate pieces that must be juggled during the remainder of the assembly process. Additionally, by firmly clipping the conduit to an electrically conductive base 10 an improved electrical contact is established between the conduit and the connector, thus providing a better ground path. After the conduit has been secured by the side clips 32 and 34, the wiring 76 carried by the flexible conduit is fed downward through the opening 15 in annular bottom portion 12, wherein the wires are protected against chafing by the rolled inner edge 14 of the bottom portion 12.

With the conduit secured to the base 10, the cap 60 is next installed onto the base 10 by first inserting cap retaining flange 58 of base 10 through the front slot 74 in the flange 68 of cap 60. The back edge of the cap is then pressed down over the side-clips 32 and 34 of base 10 such that the cap retainer tabs 46 and 48 are received in slots 70 and 72 in the flange 68 of cap 60. The cap 60 is pressed downward deflecting retaining barbs 50 and 52 of cap retainer tabs 48 and 46 in line with respective retaining tabs 48 and 46. As the flange 68 of cap 60 clears the retaining barbs 50 and 52, the retaining barbs 50 and 52 recover to their initial configuration, thus securing cap 60 to the base in a snap-fit manner.

The assembled connector, having the flexible conduit securely retained thereby, is installed in the junction box 80 by inserting the connector through a knockout hole. As the connector is pressed into the knockout hole, the conical segments 16, 18, 20, and 22 deflect toward the axial center of the conical portion. When retaining members 26 pass completely through the knockout hole they spring back to their original shape, as shown in FIG. 6, thereby preventing the withdrawal of the connector from the knockout hole.

Over insertion of the connector is prevented by front flanges 54 and 56, as well as by planar member 30 and the flange 68 of cap 60. The radial force resulting from the spring preload of the conical segments 16, 18, 20, and 22, acting through the inclined surfaces of the conical segments 16, 18, 20, and 22, provides an extracting force which is resisted by retaining barbs 26. This provides secure retention of the connector in the knockout hole, as well as a positive electrical connection between the connector and the junction box.

It will be appreciated that the exemplary embodiment described and depicted in the accompanying drawings herein is for illustrative purposes only, and should not be interpreted as a limitation. It is obvious that many other embodiments, which will be readily apparent to those skilled in the art, may be made without departing materially from the spirit and scope of the invention as defined in the appended claims.

What is claimed is:

1. A connector for connecting conduit to a junction box having an opening therein, said connector comprising:
    a base for receiving said conduit at approximately a right angle to said opening, said base comprising at least one cap retainer tab extending therefrom; and
    a cap configured to cover at least a portion of said base with a portion of said conduit disposed between said cap and said base, said cap comprising a slot configured to receive said retainer tab to establish a snap-fit connection between said base and said cap, wherein said base further comprises a plurality of spring members for resiliently retaining said conduit at approximately a right angle to said opening in said junction box.

2. A connector according to claim 1, wherein said base further comprises a plurality of resiliently deformable elements configured to establish a snap fit connection with said opening in said junction box.

3. A connector according to claim 2, wherein said resiliently deformable elements extend from an annular bottom portion defining an opening through which wires in said conduit may pass to enter said junction box.

4. A connector according to claim 1, wherein said base further comprises a retaining flange and wherein said cap further comprises a flange slot for receiving said retainer flange.

5. A connector according to claim 1, wherein said base further comprises at least one protrusion positioned to extend into a helical groove in said conduit.

6. A connector according to claim 1, wherein said base further comprises at least one stop tab for resisting motion of said conduit relative to said base toward said opening in said junction box.

7. A connector according to claim 1, wherein said base comprises an electrically conductive material for establishing an electrical connection with said conduit.

8. A connector according to claim 1, wherein said cap further comprises at least one protrusion positioned to extend into a helical groove in said conduit.

9. A connector for connecting conduit to a junction box having an opening therein, said connector comprising:

a base comprising a plurality of spring members for resiliently retaining said conduit at approximately a right angle to said opening in said junction box; and a cap configured to cover at least a portion of said base with a portion of said conduit disposed between said cap and said base.

10. A connector according to claim 9, wherein said base further comprises a plurality of resiliently deformable elements configured to establish a snap fit connection with said opening in said junction box.

11. A connector according to claim 10, wherein said resiliently deformable elements extend from an annular bottom portion defining an opening through which wires in said conduit may pass to enter said junction box.

12. A connector according to claim 9, wherein said base further comprises a retaining flange and wherein said cap further comprises a flange slot for receiving said retainer flange.

13. A connector according to claim 9, wherein said base further comprises at least one protrusion positioned to extend into a helical groove in said conduit.

14. A connector according to claim 9, wherein said base further comprises at least one stop tab for resisting motion of said conduit relative to said base toward said opening in said junction box.

15. A connector according to claim 9, wherein said base comprises an electrically conductive material for establishing an electrical connection with said conduit.

16. A connector according to claim 9, wherein said cap further comprises at least one protrusion positioned to extend into a helical groove in said conduit.

17. A connector for connecting conduit to a junction box having an opening therein, said connector comprising:

a base comprising a plurality of resiliently deformable elements configured to establish a snap fit connection with said opening in said junction box, said base further comprising at least one spring member for resiliently retaining said conduit at approximately a right angle to said opening in said junction box.

18. A connector according to claim 17, wherein said resiliently deformable elements extend from an annular bottom portion defining an opening through which wires in said conduit may pass to enter said junction box.

19. A connector according to claim 17, wherein said base further comprises a retaining flange and wherein said cap further comprises a flange slot for receiving said retainer flange.

20. A connector according to claim 17, wherein said base further comprises at least one protrusion positioned to extend into a helical groove in said conduit.

21. A connector according to claim 17, wherein said base further comprises at least one stop tab for resisting motion of said conduit relative to said base toward said opening in said junction box.

22. A connector according to claim 17, wherein said base comprises an electrically conductive material for establishing an electrical connection with said conduit.

23. A connector according to claim 17, wherein said cap further comprises at least one protrusion positioned to extend into a helical groove in said conduit.

24. A connector according to claim 17, said connector further comprising a cap configured to cover at least a portion of said base with a portion of said conduit disposed between said cap and said base.

* * * * *